Figure 1:
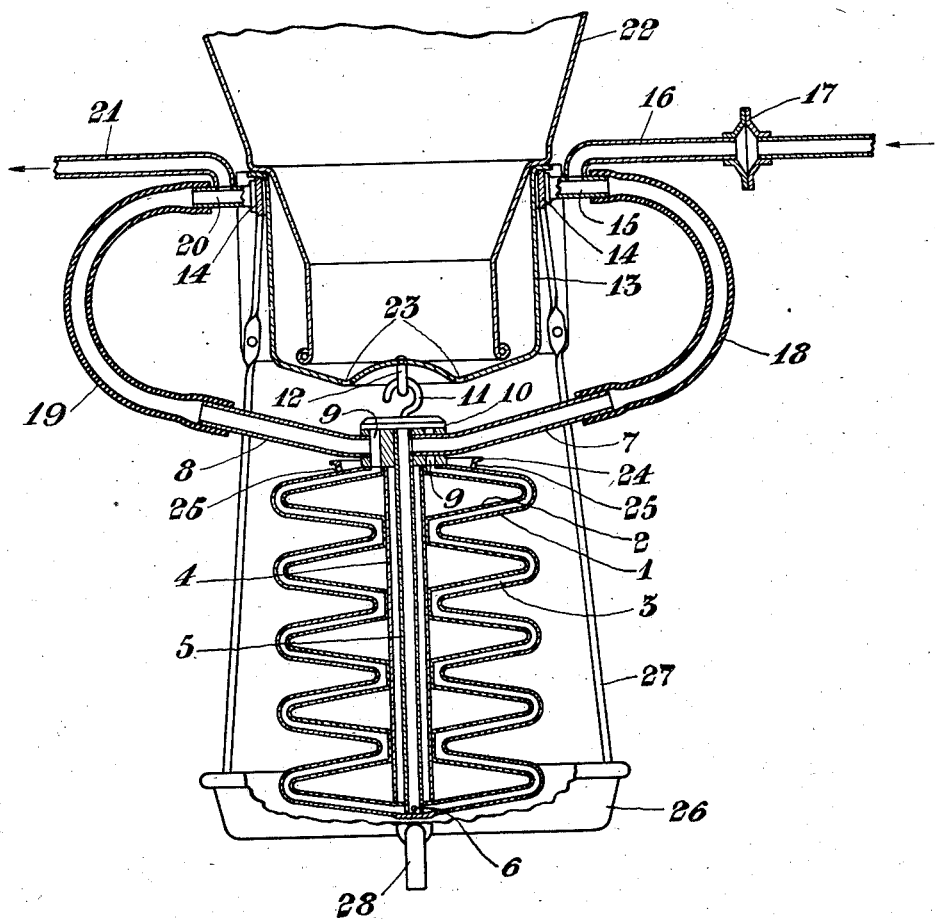

May 12, 1936.  E. A. KARLSSON  2,040,139
MILK COOLER
Filed Feb. 26, 1935  2 Sheets-Sheet 1

Inventor:
Edvin Allan Karlsson
by George Bayard Jones
Attorney.

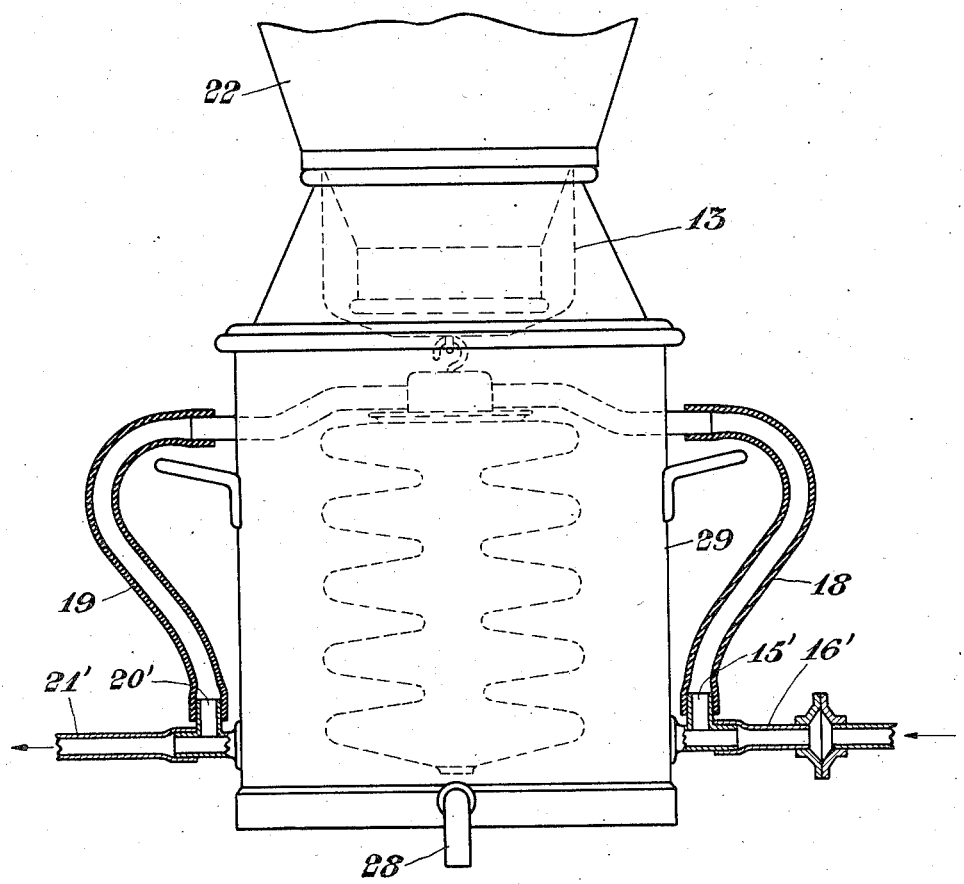

Patented May 12, 1936

2,040,139

UNITED STATES PATENT OFFICE 2,040,139

MILK COOLER

Edvin Allan Karlsson, Soderkoping, Sweden, assignor to Carl Elis Ellison, Norrkoping, Sweden Application February 26, 1935, Serial No. 8,295
In Sweden February 28, 1934

5 Claims. (Cl. 257—179)

The present invention relates to a milk cooler of the type which consists of a cooler body, shell, or tube, having transverse corrugations or folds, or double-conical collars or the like, i. e. which has a bellows-like shape, and over the outer surface of which the milk to be cooled is allowed to flow, and within which another body, shell, or tube having a corresponding or approximately corresponding shape is provided, so that a passage for cooling water, i. e. a water jacket, is formed between said two bodies, shells, or tubes, through which passage cooling water is allowed to flow for cooling the milk flowing over the outer surface of the milk cooler.

The present invention is principally characterized by the inner surface of the inner shell or tube being heat-insulated from the outside air. As against hitherto existing milk coolers of this type in which the inner shell is subjected to the temperature of the outside air, the present invention provides the advantage that no heat is transmitted to the cooling water through the inner shell, so that the cooling power of the water will be completely utilized for cooling the milk. The heat insulation of the inner shell, according to the invention, is suitably accomplished by a tube being inserted into said inner shell and, optionally, attached thereto, so that one or more closed air chambers is or are formed between said tube and said inner shell.

The cooling water is suitably admitted into the lower end of the water jacket formed between the two shells, and is allowed to flow upwards through said jacket. According to the invention, a cooling water inlet tube which extends from the top of the cooler to the lower end of the same where it is connected to the water jacket, is located centrally in the cooler and is heat-insulated from the inner shell. Such heat insulation of the water inlet tube may suitably be effected by arranging said tube in the above mentioned tube, which is inserted in the inner shell, in such manner that a closed air chamber is formed between these two tubes.

In the accompanying drawings, Fig. 1 shows a constructional form of a milk cooler according to the present invention which in this case is suspended from a ring bracket. As shown in Fig. 2, the milk cooler is suspended within a vessel.

The milk cooler consists of a cooling body or outer shell 1 which may be made, for instance, of thin sheet metal, and which has a bellows-like shape, that is to say, it is provided with transverse corrugations folds, or collars, the upper and lower sides of which consist of conical surfaces joined together by rounded surfaces. Located inside the shell 1 is a second shell 2 shaped in a corresponding manner, so that a passage 3 for cooling water, that is, a water jacket, is formed between the two shells 1 and 2.

Provided inside the shell 2 is a tube 4 to which the upper and lower ends of the shell 2 are airtightly secured, so that the interior of the shell 2 is shut off from the outside air. In the constructional form illustrated in the drawings, the tube 4 is also secured at intermediate points to the inner surface of the shell 2, that is to say, at the contractions of the same, so that, in the instance illustrated, a closed air chamber is formed inside the inner shell 2 in each fold or corrugation of the cooler. In this way the inner shell 2 is thus well insulated so that transmission of heat through the same to the cooling water flowing in the passage 3 is eliminated.

Water is supplied through a tube 5 which extends from the upper end of the cooler to its lower end at which said tube communicates through holes 6 with the water passage 3, the lower end of the tube being closed. The tube 5 is located centrally in the cooler and at a distance from the tube 4, and the space between these two tubes is closed at the top as well as at the bottom, as shown in the drawings, so as to provide a closed air chamber which prevents the transmission of heat to the cooling water flowing downwards through the tube 5. Said tube 5 communicates at the top with a nipple 7, through which the cooling water is admitted to the tube 5. The water flowing upwards through the passage 3 flows off through a nipple 8 which communicates with a groove 9 in the top piece 10 of the cooler which groove 9 also communicates with the passage 3.

By means of a hook 11 provided in the top piece 10 the cooler is suspended in an eye 12 attached to a cup 13 serving to receive the milk to be cooled, said cup being supported, as shown in Fig. 1, by a ring bracket 14 which is secured in any convenient manner to a wall or the like. Provided on the ring 14 is a nipple 15 to which the supply pipe 16 for the cooling water is connected, a water filter 17 being provided in said pipe for preventing impurities in the water from entering and clogging the passages in the cooler. The cooling water is conducted through a rubber tube 18 from the nipple 15 to the nipple 7. A rubber tube 19 leads from the nipple 8 to a nipple 20 which also is attached to the ring bracket 14 and which communicates with the discharge pipe 21.

The milk is poured through the milk strainer 22, from which the milk flows down into the cup 13 the bottom of which is provided with a circle of holes 23 through which the milk flows into a cup 24 provided on the top of the cooler. Said cup 24 is provided along its circumference with holes 25 through which the milk flows out over the cooled outer surface of the outer shell 1 and follows said surface downwards and finally flows down into a lower collecting bowl 26, which is supported by means of stays 27 from the ring bracket 14. From said bowl 26 the milk flows out through the tap 28 into a suitable receiver.

Since the cooler is movably suspended at a point in its vertical axis the cooler will always occupy a vertical position, even if the cup 13 and the other parts above the cooler do not occupy such position. The milk will therefore always flow evenly around the cooler without it being necessary to perform a special adjustment of the cooler for this purpose.

Such automatic adjustment of the cooler in the vertical position is also attained with the construction illustrated in Fig. 2, in which the cup 13, from which the cooler is suspended, rests against the rim of a vessel 29 into which the cooler is thus lowered. The vessel 29 is intended to be placed on a table or other support, and since in this case the ring bracket 14 according to Fig. 1 will not be used, the water supply pipe 16' and the water discharge pipe 21' with the nipples 15' and 20' to which the rubber tubes 18 and 19 are connected, are attached to the vessel 29.

The invention is of course not limited to the constructional form above described and illustrated in the drawings the details of which may be modified in various ways within the scope of the invention.

I claim:

1. A milk cooler, comprising in combination two shells having transverse corrugations and located one within the other so as to form a passage for a cooling medium between said shells, and a tube inserted within such inner shell and contacting with the inner bends of the corrugations of the same so as to form closed air chambers between said tube and said inner shell.

2. A milk cooler, comprising in combination a shell having transverse corrugations, a second shell inserted within the first-named shell and having a substantially corresponding shape, said two shells forming a passage for a cooling medium, means for heat insulating the inner surface of said inner shell from the outside air, and a water inlet tube extending from the top of the cooler and communicating with said passage at the lower end of the cooler, said tube being located centrally in the cooler and being heat insulated from said inner shell.

3. A milk cooler, comprising in combination two shells having transverse corrugations and located one within the other so as to form a passage for a cooling medium between said shells, a tube inserted within such inner shell so as to form closed air chambers between said tube and said inner shell, and a water inlet tube extending from the top of the cooler and communicating with said passage at the lower end of the cooler, said tube being located centrally in the cooler and being heat insulated from said inner shell.

4. A milk cooler, comprising in combination two shells having transverse corrugations and located one within the other so as to form a passage for a cooling medium between said shells, a tube inserted within such inner shell so as to form closed air chambers between said tube and said inner shell, and a water inlet tube extending from the top of the cooler and communicating with said passage at the lower end of the cooler, said water inlet tube being located within said firstnamed tube inserted within said inner shell at such distance from said tube that a closed air chamber is formed between said two tubes.

5. A milk cooler, comprising in combination two shells having transverse corrugations and located one within the other so as to form a passage for a cooling medium between said shells, a tube inserted within such inner shell so as to form closed air chambers between said tube and said inner shell, a water inlet tube extending from the top of the cooler and communicating with said passage at the lower end of the cooler, said tube being located centrally in the cooler and being heat insulated from said inner shell, a supporting device for the cooler, means for movably suspending the cooler from said device at a point in the vertical axis of the cooler, nipples communicating with said water inlet tube and with said passage provided at the top of the cooler near the point of suspension thereof, nipples carried by said supporting device, a water supply pipe connected to one of said nipples, a water discharge pipe connected to the other of said nipples, and elastic tubes connecting said nipples on said supporting device with said firstmentioned nipples on the cooler.

EDVIN ALLAN KARLSSON.